(12) United States Patent
Khosravi et al.

(10) Patent No.: US 8,489,686 B2
(45) Date of Patent: Jul. 16, 2013

(54) METHOD AND APPARATUS ALLOWING SCAN OF DATA STORAGE DEVICE FROM REMOTE SERVER

(75) Inventors: Hormuzd Khosravi, Portland, OR (US); David Durham, Beaverton, OR (US); David A. Edwards, Phoenix, AZ (US); Venkat R. Gokulrangan, Portland, OR (US); Men Long, Beaverton, OR (US); Yasser Rasheed, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 588 days.

(21) Appl. No.: 12/785,131

(22) Filed: May 21, 2010

(65) Prior Publication Data

US 2011/0289146 A1    Nov. 24, 2011

(51) Int. Cl.
*G06F 15/16* (2006.01)
(52) U.S. Cl.
USPC .......................................... 709/205; 709/203
(58) Field of Classification Search
USPC ................ 709/203, 205, 213; 717/174; 713/2
See application file for complete search history.

(56) References Cited

U.S. PATENT DOCUMENTS

| | | | |
|---|---|---|---|
| 5,987,506 A * | 11/1999 | Carter et al. | 709/213 |
| 2010/0306177 A1 * | 12/2010 | Khosravi et al. | 707/674 |
| 2012/0203980 A1 * | 8/2012 | Flynn et al. | 711/154 |

OTHER PUBLICATIONS

"Out-of-Band", Wikipedia, The Free Encyclopedia, retreived on Apr. 2, 2011, Webpage available at: <http://en.wikipedia.org/wiki/Out-of-band>.

* cited by examiner

*Primary Examiner* — Frantz Jean
(74) *Attorney, Agent, or Firm* — Barnes & Thornburg LLP

(57) ABSTRACT

A method and device allowing a scan of a data storage device from a remote server are disclosed. In some embodiments, a computing device may include an out-of-band (OOB) configured to compute a first hash value for data stored in one or more sectors of a data storage device at a first time; receive, using communication circuitry, a request to transmit a portion of the data stored in the one or more sectors of the data storage device at a second time, the second time being subsequent to the first time; compute a second hash value for the data stored in the one or more sectors of the data storage device at the second time; and transmit, using the communication circuitry, the requested portion of the data, only if the second hash value does not match the first hash value.

20 Claims, 4 Drawing Sheets

METHOD AND APPARATUS ALLOWING SCAN OF DATA STORAGE DEVICE FROM REMOTE SERVER

BACKGROUND

The data residing on data storage devices, such as hard disk drives and solid state drives, by way of example, is subject to corruption and attack by malicious software ("malware"). Anti-virus and manageability software packages have been developed by independent software vendors (ISVs) to scan data storage devices to detect corrupted data or malware and/or to provide back-up copies of data. Some storage, security, and manageability ISVs implement services, such as anti-virus scans, removal of malware, system repair, and system reimaging, for example, over the Internet. These Internet-based services typically rely on local software agents running on the local computing device.

Transferring the entire contents of a data storage device over the Internet for scanning by an ISV application, however, is cumbersome and time-consuming. One approach to alleviating this burden is to evaluate which data stored in the data storage device has been altered since a previous scan and transmit only the altered data for scanning. Implementations of this approach have typically relied on the local software agents to determine which data has been altered since a previous scan (for example, by evaluating a Master File Table (MFT) of the data storage device). These software solutions, however, are themselves subject to attack by rootkits, spyware, and other types of malware that operate on the premise of hiding themselves from detection. For instance, malware may be able to provide out-of-date copies of the MFT to a local software agent, fooling the software agent into thinking that no changes to the data have taken place (thereby hiding its subsequent activities from the software agent). Once such malware is able to hide itself and its activities from the ISV applications (e.g., using an old MFT), the malware can observe user activity, capture user data, perform circumvention of user actions, and other malicious activities. An increasing number of incidents of rootkits, spyware, and other malware have been discovered hiding themselves from users and executing in the background of computing systems, collecting sensitive information and slowing down the systems considerably.

BRIEF DESCRIPTION OF THE DRAWINGS

The systems, devices, and methods described herein are illustrated by way of example, and not by way of limitation, in the accompanying figures. For simplicity and clarity of illustration, elements illustrated in the figures are not necessarily drawn to scale. For example, the dimensions of some elements may be exaggerated relative to other elements for clarity. In the following figures.

DETAILED DESCRIPTION OF THE DRAWINGS

Figure 1:
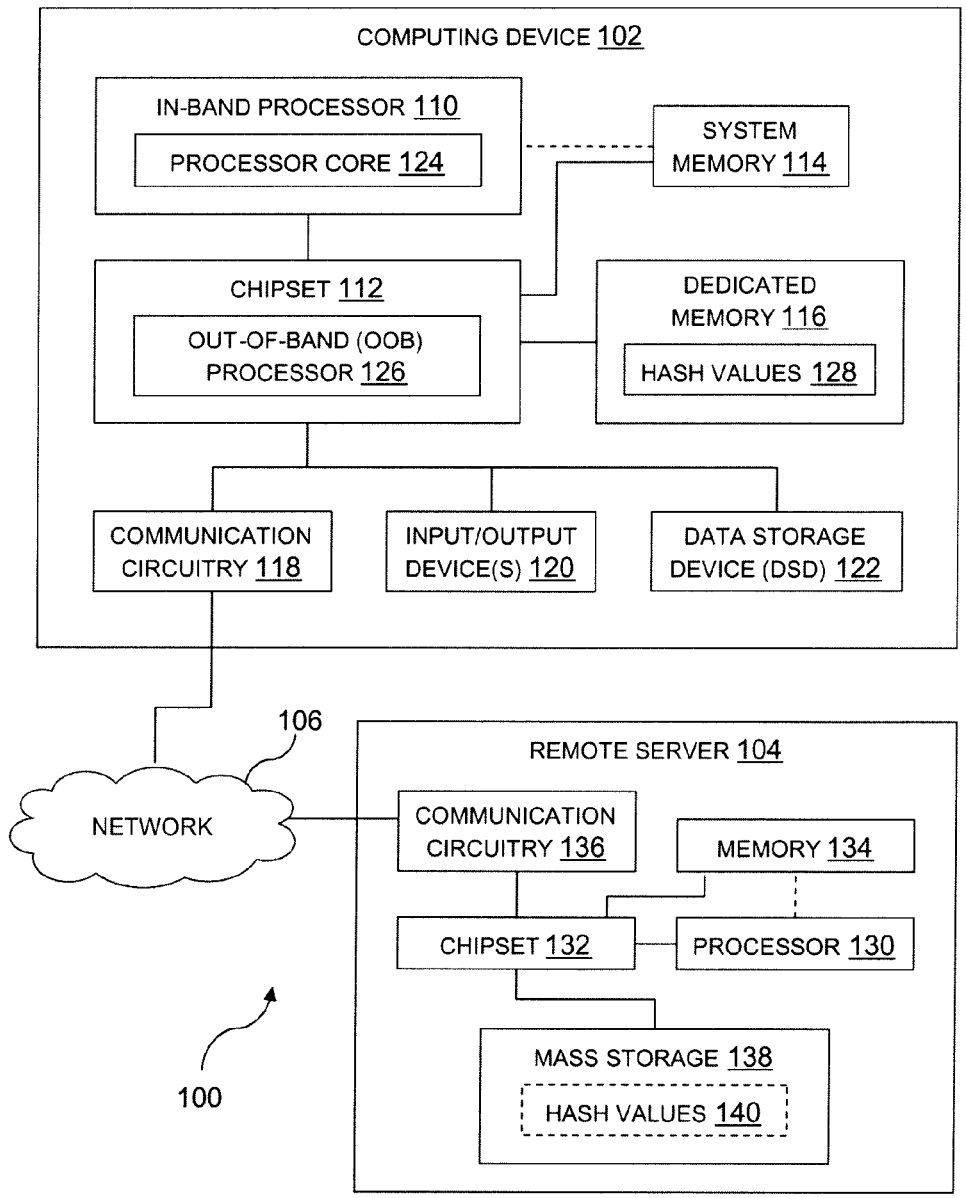
FIG. 1 is a simplified block diagram of one embodiment of a system configured to allow a scan of a data storage device of a computing device from a remote server.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits, and full software instruction sequences may have not been shown in detail in order not to obscure the disclosure. Those of ordinary skill in the art, with the included descriptions, will be able to implement appropriate functionality without undue experimentation.

References in the specification to "one embodiment", "an embodiment", "an illustrative embodiment", etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure may be implemented in hardware, firmware, software, or any combination thereof. Embodiments of the disclosure implemented in a computing device may include one or more bus-based interconnects between components and/or one or more point-to-point interconnects between components. Embodiments of the invention may also be implemented as instructions stored one or more tangible, machine-readable media, which may be read and executed by one or more processors. A tangible, machine-readable medium may include any tangible mechanism for storing or transmitting information in a form readable by a machine (e.g., a computing device). For example, a tangible, machine-readable medium may include read only memory (ROM), random access memory (RAM), magnetic disk storage media, optical storage media, flash memory devices, and other tangible media.

The present disclosure generally relates to methods and apparatus that allow an efficient scan of a data storage device from a remote server. These methods and apparatus evaluate which data stored in the data storage device has been altered since a previous scan and transmit only the altered data to the remote server for scanning. According to the present disclosure, an out-of-band (OOB) processor and a dedicated memory space are used to compute and store hash values for the data stored in the data storage device. If the hash value for the same one or more sectors differs at distinct times, the OOB processor may determine that the data stored in the one or more sectors has changed. As the OOB processor is tamper resistant, the remote server may be assured that the data records are not being forged by some piece of malware. Initially, various hardware components of a system 100 are described below with reference to FIG. 1. Next, an embodiment in which the OOB processor computes the hash values using data from individual sectors of the data storage device is described below as a method 200 with reference to FIG. 2. Finally, another embodiment in which the OOB processor computes the hash values using data from sector directories (each including multiple sectors) of the data storage device is described below as a method 300 with reference to FIGS. 3 and 4.

Referring now to FIG. 1, one embodiment of the system 100 configured to allow a scan of a data storage device 122 from a remote server 104 includes a computing device 102, the remote server 104, and a network 106 that communicatively couples the computing device 102 to the remote server 104. Although only one computing device 102, one remote server 104, and one network 106 are illustratively shown in FIG. 1, the system 100 may include any number of computing devices 102, remote servers 104, and networks 106 of similar or dissimilar architecture. For instance, the computing device 102 may communicate over one or more networks 106 with multiple remote servers 104, and each remote server 104 may communicate over one or more networks 106 with multiple computing devices 102.

The computing device 102 may be embodied as any type of electronic device capable of performing the functions described herein. By way of example, the computing device 102 may be embodied as a personal computer, a workstation, a laptop computer, a handheld computer, a mobile internet device, a cellular phone, a personal data assistant, a telephony device, a network appliance, a virtualization device, a storage controller, or other computer-based device. In the illustrative embodiment shown in FIG. 1, the computing device 102 includes an in-band processor 110, a chipset 112, a system memory 114, a dedicated memory space 116, communication circuitry 118, one or more input/output devices 120, and a data storage device 122. In some embodiments, several of the foregoing components may be incorporated on a motherboard of the computing device 102, while other components may be communicatively coupled to the motherboard via, for example, a peripheral port. Furthermore, it should be appreciated that the computing device 102 may include other components, sub-components, and devices commonly found in a computer and/or computing device, which are not illustrated in FIG. 1 for clarity of the description.

The in-band processor 110 of the computing device 102 may be any type of processor capable of executing software/firmware, such as a microprocessor, digital signal processor, microcontroller, or the like. The in-band processor 110 is illustratively embodied as a single core processor having a processor core 124. However, in other embodiments, the in-band processor 110 may be embodied as a multi-core processor having multiple processor cores 124. Additionally, the computing device 102 may include additional in-band processors 110 having one or more processor cores 124. The in-band processor 110 is generally responsible for executing a software stack, which may include an operating system and various applications, programs, libraries, and drivers resident on the computing device 102.

The chipset 112 of the computing device 102 may include a memory controller hub (MCH or "northbridge"), an input/output controller hub (ICH or "southbridge"), and a firmware device. The firmware device of the chipset 112 may be embodied as a memory device for storing Basic Input/Output System (BIOS) data and/or instructions and/or other information (e.g., a BIOS driver used during booting of the computing device 102). In other embodiments, chipsets having other configurations may be used. For example, in some embodiments, the chipset 112 may be embodied as a platform controller hub (PCH). In such embodiments, the memory controller hub (MCH) may be incorporated in or otherwise associated with the in-band processor 110, and the in-band processor 110 may communicate directly with the system memory 114 (as shown by the hashed line in FIG. 1). In any of these configurations, the chipset 112 also includes an out-of-band (OOB) processor 126, which will be described in more detail below.

The in-band processor 110 is communicatively coupled to the chipset 112 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The system memory 114 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single system memory device 114 is illustrated in FIG. 1, in other embodiments, the computing device 102 may include additional system memory devices. The operating system, applications, programs, libraries, and drivers that make up the software stack executed by the in-band processor 110 may reside in system memory 114 during execution. Furthermore, software and data stored in system memory 114 may be swapped between system memory 114 and the data storage device 122 as part of memory management operations. The system memory 114 of the computing device 102 is communicatively coupled to the chipset 112 (or, possibly, the in-band processor 110) via a number of signal paths.

The dedicated memory 116 of the computing device 102 is illustratively embodied as a memory space that is accessible to the OOB processor 126 but not to the in-band processor 110. Being non-accessible to the in-band processor 110 helps to protect the dedicated memory space 116 from corruption by malware. In some embodiments, the dedicated memory space 116 may be a non-volatile memory device (e.g., a flash memory device) that is distinct from the system memory 114 and the data storage device 122, as shown in FIG. 1. In such embodiments, the dedicated memory space 116 is also communicatively coupled to the chipset 112 via a number of signal paths. In other embodiments, the dedicated memory space 116 may include one or more data storage locations in another memory device. For instance, the dedicated memory space 116 may be a dedicated partition of the data storage device 122 or may be located in the firmware device of the chipset 112. Among other types of data, the dedicated memory space 116 may store hash values 128 received from the OOB processor 126, as described in more detail below.

The communication circuitry 118 of the computing device 102 may be embodied as any number of devices and circuitry for enabling communications between the computing device 102 and the remote server 104 over the network 106. The network 106 may be embodied as any type of wired and/or wireless network, such as a local area network, a wide area network, a publicly available global network (e.g., the Internet), or any combination thereof. Furthermore, the network 106 may include any number of additional devices to facilitate communication between the computing device 102 and the remote server 104, such as routers, switches, intervening computers, and/or the like. The communication circuitry 118 may include one or more wired and/or wireless network interfaces to facilitate communications over the wired and/or wireless portions of the network 106. Communication circuitry 118 is also communicatively coupled to the chipset 112 via a number of signal paths, allowing both the in-band processor 110 and the OOB processor 126 to independently access the network 106.

The input/output device(s) 120 of computing device 102 may include any number of peripheral or interface devices. By way of illustrative example, the input/output device(s) 120 may include a display, a mouse, a keyboard, and/or one or more external speakers of the computing device 102. The particular devices included in the input/output device(s) 120 may depend upon, for example, the intended use of the computing device 102. The input/output device(s) 120 are communicatively coupled to the chipset 112 via a number of signal paths, allowing the chipset 112 and/or in-band processor 110 to receive inputs from and send outputs to the input/output device(s) 120, in some embodiments.

The computing device 102 also includes a data storage device (DSD) 122, which may be illustratively embodied as any type of device configured for the short-term or long-term storage of data such as, for example, memory devices and circuits, memory cards, hard disk drives, solid-state drives, or other data storage devices. In some embodiments, the DSD 122 may include non-volatile memory capable of retaining stored data even when the DSD 122 is not powered. Additionally, although only a single DSD 122 is illustrated in FIG. 1, in other embodiments, the computing device 102 may include additional data storage devices. The DSD 122 is also communicatively coupled to the chipset 112 via a number of signal paths. In some embodiments, the DSD 122 may be coupled to the chipset 112 via a high-speed serial link, such as a Peripheral Component Interconnect Express (PCIe) interface or a Serial AT Attachment (SATA) interface. It will be appreciated that other types of interfaces between the DSD 122 and the chipset 112 (e.g., parallel signal paths) are contemplated.

The chipset 112 includes an out-of-band (OOB) processor 126, which is distinct from and generally operates independently of the in-band processor 110. The OOB processor 126 may be embodied as any type of processor capable of executing software/firmware, such as a microprocessor, digital signal processor, microcontroller, or the like, including one or more processors having one or more processor cores (not shown). Although the OOB processor 126 is illustrated in FIG. 1 as being integrated into the chipset 112, in other embodiments, the OOB processor 126 may be embodied as one or more separate integrated circuits disposed on an expansion board that is communicatively coupled to the chipset 112 via a number of signal paths. In some embodiments, the OOB processor 126 may be independently communicatively coupled to various components of the computing device 102 (e.g., the dedicated memory space 116, the communication circuitry 118, the DSD 122) via a number of signal paths. Alternatively or additionally, the OOB processor 126 may include built-in components with similar functionality, such as a dedicated memory space and/or dedicated communication circuitry (not shown).

The OOB processor 126 is configured for managing particular functions of the computing device 102 irrespective of the operational state of the in-band processor 110 of the computing device 102. To facilitate such independent operation, the OOB processor 126 may be provided with an independent connection to the power circuitry (not shown) of the computing device 102, allowing the OOB processor 126 to retain power even when other components of the computing device 102 are powered down or turned off. Furthermore, the OOB processor 126 may be provided with one or more independent network interfaces via communication circuitry 118, which may also be provided with an independent connection to the power circuitry (not shown), allowing out-of-band communications over the network 106. In other words, the OOB processor 126 is able to communicate directly with devices on the network 106 (e.g., remote server 104), outside of the software stack executing on the in-band processor 110. In fact, this communication may take place without a user's knowledge.

The OOB processor 126 is also capable of retrieving data stored in the DSD 122. In some embodiments, the OOB processor 126 may be provided with one or more independent interfaces to the DSD 122, which may also be provided with an independent connection to the power circuitry (not shown), allowing the OOB processor 126 to communicate with the DSD 122 outside of the software stack executing on the in-band processor 110. In other embodiments, the OOB processor 126 may retrieve data stored in the DSD 122 by forwarding a read request to a host driver executing on the in-band processor 110 (e.g., a BIOS driver or Advanced Host Controller Interface driver). The host driver may retrieve the requested data from DSD 122 and pass this data to the OOB processor 126 (e.g., using a Host Embedded Controller Interface (HECI) or any other memory channel shared). In such embodiments, the OOB processor 126 may be capable of causing the computing device 102 to return to a full-power operational state, including booting the operating system. In summary, the OOB processor 126 may operate intelligently based on incoming requests/commands to retrieve data stored in DSD 122 and communicate across the network 106 whether the in-band processor 110 is turned off, running on standby, being initialized, or in regular operation and whether the operating system is booting, running, crashed, or otherwise.

In some illustrative embodiments, the OOB processor 126 may be implemented using Intel® Active Management Technology (Intel® AMT), using a portion of Intel® AMT, or using an Intel® Management Engine (Intel® ME), all available from Intel Corporation of Santa Clara, Calif., and/or within chipsets sold by Intel Corporation. Intel AMT® embedded platform technology enables out-of-band access to hardware and software information stored in non-volatile memory on each endpoint device, eliminating the need for a functioning operating system and many of the software agents found in other management tools.

The remote server 104 may be embodied as any type of computing device separate from the computing device 102. By way of example, the remote server 104 may be embodied as a personal computer, a workstation, a laptop computer, a handheld computer, a mobile internet device, a cellular phone, a personal data assistant, a telephony device, a network appliance, a virtualization device, a storage controller, or other computer-based devices configured to communicate with the computing device 102 over the network 106. In the illustrative embodiment shown in FIG. 1, the remote server 104 includes a processor 130, a chipset 132, a system memory 134, communication circuitry 136, and one or more mass storage devices 138 (which may each be similar in configuration and operation to the in-band processor 110, the chipset 112, the system memory 114, the communication circuitry 118, and the data storage device 122, respectively, of computing device 102). It is contemplated that the remote server 104 may have other configurations and/or include other components not shown in FIG. 1 (e.g., one or more input/output devices). In some embodiments, the one or more mass storage devices 138 may store hash values 140 (e.g., received from the OOB processor 126 or the processor 130), similar to the dedicated memory space 116.

Figure 2:
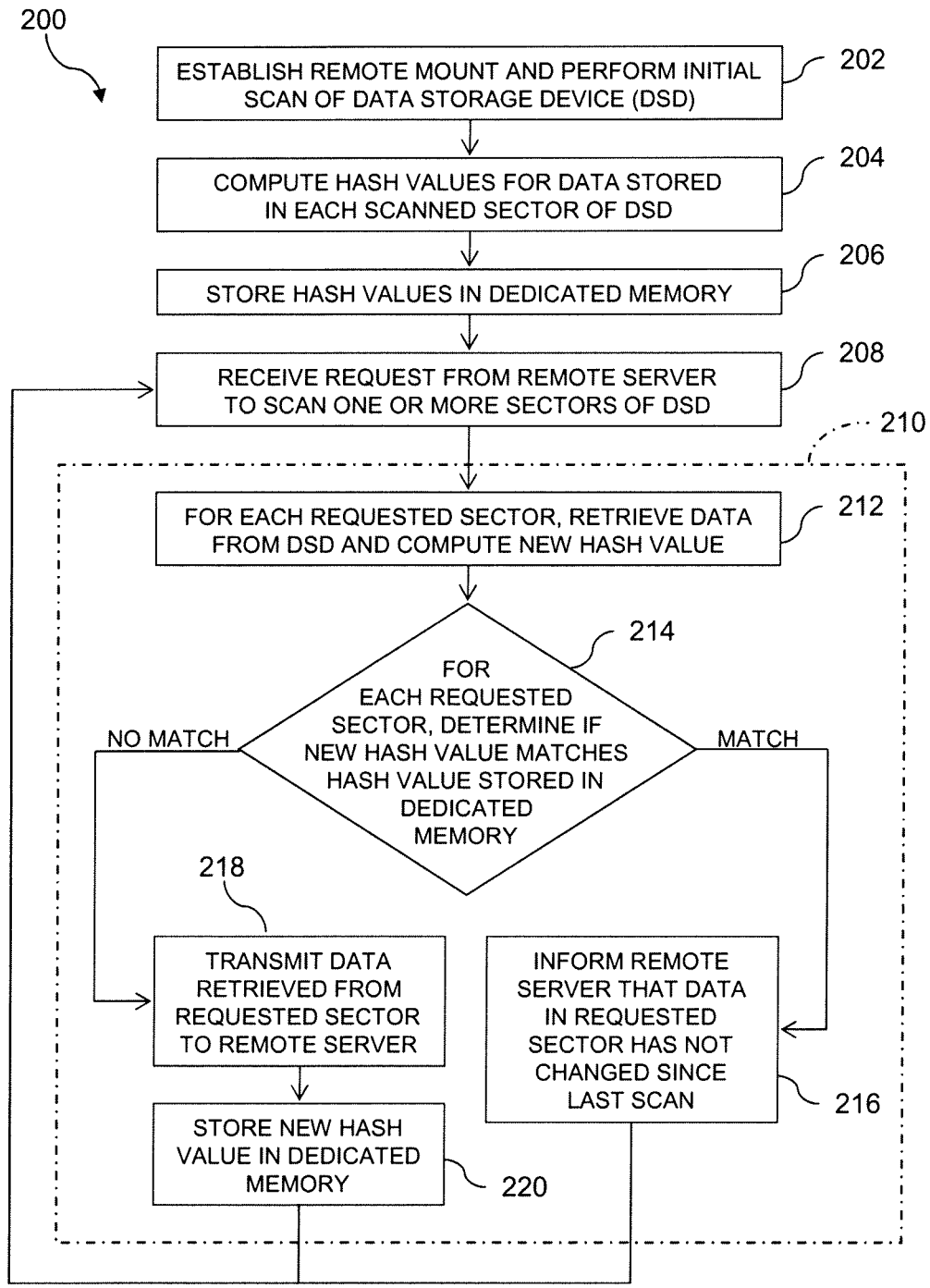
FIG. 2 is a simplified flow diagram of one embodiment of a method of scanning a data storage device from a remote server, which may be executed by the computing device of FIG. 1.

Several of the features of OOB processor 126, including its persistent power connection and independent communication channel, allow the system 100 to provide a scan of the DSD 122 of the computing device 102 from the remote server 104. To do so, as illustrated in FIG. 2, the computing device 102 may be configured to execute a method 200 for providing an efficient scan over the network 106. In general, the method 200 involves the computation and comparison of hash values 128 for data stored in individual sectors of the DSD 122. The method 200 may be executed by, for example, the OOB processor 126, in conjunction with other components of the computing device 102, which may interact with other components of the system 100. The method 200 may allow an efficient scan of the DSD 122 from the remote server 104 for any purpose, including, but not limited to, anti-virus scans, removal of malware, system repair, system reimaging, and secure file/folder access.

The method 200 begins with block 202 in which the OOB processor 126 establishes a remote mount of the DSD 122 by the remote server 104 and performs an initial scan of the DSD 122. The remote mount of the DSD 122 may be initiated by either the computing device 102 or the remote server 104. One process for remotely mounting a data storage device using a remote server, which may be employed in block 202 of the method 200, is disclosed in currently pending U.S. patent application Ser. No. 12/475,216, filed May 29, 2009, and assigned to the assignee of the present application. As described therein, the remote server 104 may request, and the OOB processor 126 may transmit, the master boot record (MBR), one or more boot sectors, and/or one or more master file tables (MFTs) of the DSD 122. This data (which may be stored as part of a disk image on the mass storage device 138) may allow the remote server 104 to map the DSD 122. Whenever data from the DSD 122 is requested by one or more ISV applications executing on the processor 130 of the remote server 104, the remote server 104 may then determine the appropriate sector(s) of the DSD 122 to request from OOB processor 126, using the MBR, the boot sector(s), and/or the MFT(s). Block 202 also involves an initial scan of the DSD 122, during which the OOB processor 126 retrieves some or, typically, all of the data stored in the DSD 122 and transmits this data to remote server 104 for evaluation by one or more ISV applications and possible storage on the mass storage device(s) 138 (as a partial or complete disk image of the DSD 122).

In block 204, the OOB processor 126 computes a hash value 128 for the data stored in each individual sector of the DSD 122 that was retrieved during the initial scan in block 202. The OOB processor 126 may compute these hash values 128 by individually applying a hash function to the data stored in each sector of the DSD 122. An illustrative hash function may convert a larger, possibly variable-sized, amount of data into a smaller piece of data (i.e., a hash value 128 that represents the larger amount of data). In some embodiments, the hash values 128 output by the function may be alphanumeric strings that are relatively small in size (e.g., 8 Bytes). The OOB processor 126 may compute the hash value 128 for each sector as the data stored in that sector is retrieved and/or transmitted by the OOB processor 126 during the initial scan in block 202. In other embodiments, block 204 may be performed after the initial scan in block 202 has been completed but before any data stored in the DSD 122 has been altered.

In block 206, the OOB processor 126 stores the hash values 128 computed during block 204 in the dedicated memory space 116 (as illustrated in FIG. 1). In some embodiments, the hash values 128 may be individually written to the dedicated memory space 116 as they are computed by the OOB processor 126. Where the initial scan of block 202 involves the entire contents of the DSD 122, the dedicated memory space 116 will contain a hash value 128 for data stored in each single sector of the DSD 122 at the conclusion of block 206. As described below, these hash values 128 may be used by the OOB processor 126 to reliably track changes to the data stored in the DSD 122 and, subsequently, provide efficient scans of the DSD 122.

In block 208, the OOB processor 126 receives a read request from the remote server 104 over the network 106. In the read request, the remote server 104 asks the OOB processor 126 to retrieve and transmit the data stored in one or more sectors of the DSD 122. It should be appreciated that the OOB processor 126, due to the persistent power and the out-of-band communication channel maintained by the OOB processor 126 and the communication circuitry 118, is available to receive the read request from the remote server 104 even when the in-band processor 110 of the computing device 102 is in a reduced power state or turned off. While the illustrative embodiment describes direct communications between the remote server 104 and the OOB processor 126 (via the communication circuitry 118, 136), it is also contemplated that the remote server 104 may communicate with the OOB processor 126 via one or more host-based channels (e.g., also involving the in-band processor 110).

In response to receiving the read request, the OOB processor 126 will perform a subroutine 210 (including steps 212-220) for each sector requested by the remote server 104. For instance, where the read request includes the addresses of ten sectors, the OOB processor 126 will perform the subroutine 210 ten times. In some embodiments, the subroutine 210 may be performed sequentially for each requested sector. In other embodiments, some or all of the subroutine 210 (e.g., block 216 or block 218) may be performed simultaneously for multiple sectors. The subroutine 210 allows the OOB processor 126 to determine whether an individual sector of the DSD 122 has been altered since the last scan by the remote server 104 and, thus, whether the sector should be transmitted (or not) to the remote server 104.

In block 212, the OOB processor 126 retrieves data stored in the requested sector(s) of the DSD 122. The OOB processor 126 may retrieve this data from the DSD 122 via an independent interface to the DSD 122 or via a host driver of the computing device 102, as described above. For each of the requested sectors, the OOB processor 126 then computes a new hash value 128 for the data retrieved from the requested sector. These new hash values 128 may be computed by applying the same hash function used to compute the hash values 128 in block 204 to the data newly retrieved from the DSD 122. For an illustrative hash function, identical inputs will produce identical outputs, while differing inputs will typically produce differing outputs. Thus, if the data retrieved from the sector has changed, the hash value 128 computed for the data will also typically change.

In block 214, the OOB processor 126 compares each new hash value 128 computed in block 212 to the hash value 128 computed for the same sector in block 204 to determine whether the data stored in that requested sector has been altered between the initial scan of block 202 and the read request received in block 208. In some embodiments, block 214 may involve the OOB processor 126 retrieving one or more hash values 128 from the dedicated memory space 116. If the new hash value 128 does not match the older hash value 128 (e.g., the alpha-numeric strings are not equal), the OOB processor 126 determines that the data stored in the requested sector has changed, and the method 200 proceeds to block 218. However, if the new hash value 128 does match the older hash value 128 (e.g., the alpha-numeric strings are equal), the OOB processor 126 determines that the data stored in the requested sector has not been altered since the last scan, and the method 200 instead proceeds to block 216. In block 216, the OOB processor 126 sends a message to the remote server 104 that indicates that the data stored in the requested sector of the DSD 122 has not changed and need not be resent.

In block 218, the OOB processor 126 will transmit the data retrieved from the requested sector in response to determining that the data has been altered since the last scan (i.e., the new hash value 128 not matching the older hash value 128). The OOB processor 126 may transmit the requested data to the remote server 104 via the communication circuitry 118. Where the new hash value 128 does not match the older hash value 128, the OOB processor 126 will also store the new hash value 128 in the dedicated memory space 116 (replacing the older hash value 128), as illustrated in block 220. Thus, the dedicated memory space 116 will contain an updated hash value 128 that may be used by the OOB processor 126 (for a new comparison) the next time a scan of that single sector is requested by the remote server 104. After the OOB processor 126 has completed the subroutine 210 for each sector requested by the remote server 104, the OOB processor 126 may await another read request from the remote server 104 (at which point, the method 200 may return to block 208).

Using the method 200, the amount of dedicated memory space 116 needed to store the hash values 128 for the entire contents of the DSD 122 may be determined by the size of the DSD 122 multiplied by the size of a hash value 128 divided by the size of each single sector (e.g., using an 8 Byte hash value for a 1 Terabyte DSD with 512 Byte sectors would require a 15.625 Gigabyte dedicated memory space). In embodiments where a smaller dedicated memory space 116 is desired, the system 100 may be configured to store certain hash values 128 at the computing device 102 and other hash values 140 at the remote server 104. For instance, the sectors of the DSD 122 may be grouped into sector directories (containing multiple sectors), and the computing device 102 may store hash values 128 for the data contained in these sector directories (rather than the individual sectors). Meanwhile, the remote server 104 may store hash values 140 for the data stored in the individual sectors of the DSD 122.

Figure 3:
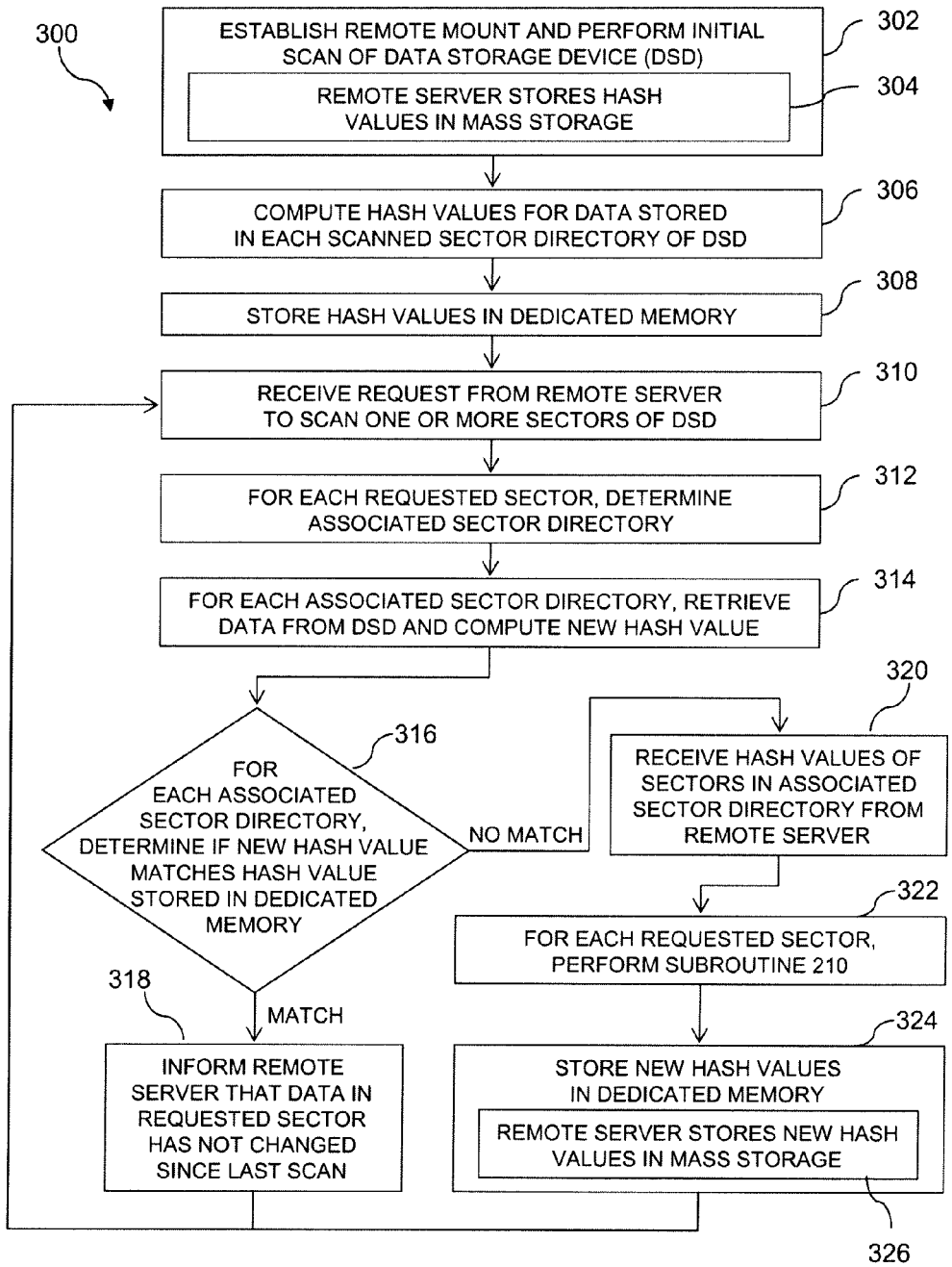
FIG. 3 is a simplified flow diagram of another embodiment of a method of scanning a data storage device from a remote server, which may be executed by the computing device of FIG. 1.

A method 300 for providing an efficient scan using such sector directory hash values is illustrated in FIG. 3. In general, the method 300 involves the computation and comparison of hash values 128 for data stored in sector directories (rather than individual sectors) of the DSD 122. Like the method 200, the method 300 may be executed by, for example, the OOB processor 126, in conjunction with other components of the computing device 102, which may interact with other components of the system 100. The dedicated memory space 116 used by the method 300 may be smaller than that used by the method 200 by a factor equal to the number of sectors in a sector directory (e.g., using the example above, but with 64 sectors per sector directory, the dedicated memory space requirement would be about 244 Megabytes).

The method 300 begins with block 302 in which the OOB processor 126 establishes a remote mount of the DSD 122 by the remote server 104 and performs an initial scan of the DSD 122. The remote mount and initial scan of the DSD 122 may proceed substantially as described above for block 202 of method 200. In addition, method 300 also involves the remote server 104 storing hash values 140 in the one or more mass storage devices 138, as illustrated by block 304 in FIG. 3. The hash values 140 represent the data stored in the individual sectors of the DSD 122 (similar to the hash values used in the method 200). In some embodiments, the hash values 140 may be computed by the OOB processor 126 and transmitted to the remote server 104 for storage. In other embodiments, the hash values 140 may be computed by the processor 130 after the data has been received by the remote server 104.

Figure 4:
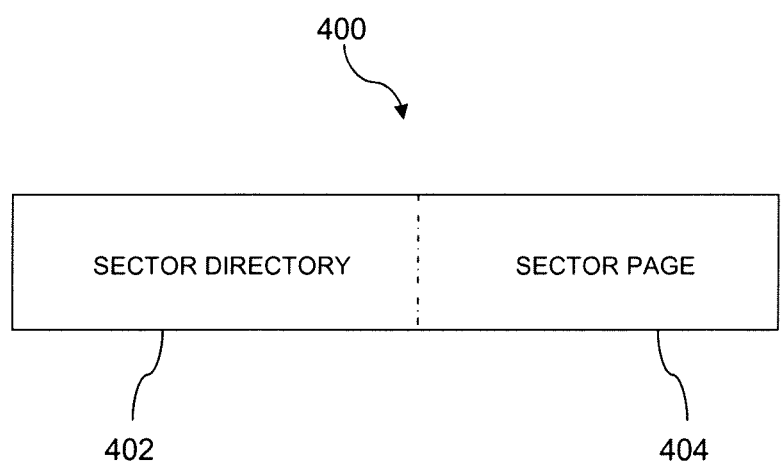
FIG. 4 illustrates one embodiment of a sector address conceptually divided into a sector directory portion and a sector page portion.

In block 306, the OOB processor 126 computes a hash value 128 for the data stored in each sector directory of the DSD 122 that was involved in the initial scan in block 302. The OOB processor 126 may compute these hash values 128 in a similar manner to the computation of hash values in block 204 of method 200, described above, except that the hash function will be applied to the data stored in an entire sector directory (rather than an individual sector) of the DSD 122. In some embodiments, a sector directory may consist of $2^N$ consecutive sectors of the DSD 122, where N is an integer. In such embodiments, a sector address 400 may be conceptually divided into a sector directory portion 402 and a sector page portion 404, as illustrated in FIG. 4. For instance, where the DSD 122 uses a 32-bit sector address 400, the sectors with addresses having the same 26 most significant bits (i.e., the sector directory portion 402) may be considered a sector directory, while the 64 sectors in each directory may be defined by the 6 least significant bits of the address 400 (i.e., the sector page portion 404). In block 308, the OOB processor 126 stores the hash values 128 computed during block 304 in the dedicated memory space 116 (in a similar manner to that describe above for block 206 of method 200).

In block 310, the OOB processor 126 receives a read request from the remote server 104 over the network 106 (similar to block 208 of method 200, described above). In some cases, the portion of the data requested by the remote server 104 may include all of the sectors contained in a sector directory (e.g., all 64 sectors), while in other cases, the requested portion of the data may only be a subset of the sectors contained in the sector directory. In block 312, the OOB processor will determine which sector directories contain the addresses of the sectors request by the remote server 104. These associated sector directories will be initially evaluated by the OOB processor 126 to determine whether the data stored in the sector directory has been altered (before examining the individual sectors of the sector directory, as described below).

In block 314, the OOB processor 126 retrieves data stored in a sector directory of the DSD 122 that was determined to be associated with a requested sector in block 312. For each of the associated sectors directories, the OOB processor 126 then computes a new hash value 128 for the data retrieved from the sector directory. The OOB processor 126 may retrieve the data and compute these new hash values 128 in a similar manner to that described above for block 212 of method 200. If the data retrieved from the sector directory has changed since the last scan, the hash value 128 computed for the data will also typically change.

In block 316, the OOB processor 126 compares each new hash value 128 computed in block 314 to the hash value 128 computed for the same sector directory in block 306. This allows the OOB processor 126 to determine whether any data stored in the associated sector directories has been altered between the initial scan in block 302 and the read request received in block 312. In some embodiments, block 316 may involve the OOB processor 126 retrieving one or more hash values 128 from the dedicated memory space 116. If the new hash value 128 does not match the older hash value 128 (e.g., the alpha-numeric strings are not equal), the OOB processor 126 determines that the data stored in the associated sector directory has changed, and the method 300 proceeds to block 320. However, if the new hash value 128 does match the older hash value 128 (e.g., the alpha-numeric strings are equal), the OOB processor 126 determines that the data stored in the associated sector directory has not been altered since the last scan, and the method 300 instead proceeds to block 318. In block 318, the OOB processor 126 sends a message to the remote server 104 that indicates that the data stored in the requested sector(s) of the associated sector directory of the DSD 122 has not changed and need not be resent.

In block 320, the OOB processor 126 requests the hash values 140 for the data stored in the individual sectors (of the associated sector directory) from the remote server in response to determining that the data of that sector directory has been altered since the last scan (i.e., the new hash value 128 not matching the older hash value 128). The OOB processor 126 may transmit the request and receive the returned hash values 140 from the remote server 104 via the communication circuitry 118. For each associated sector directory with changes, the remote server 104 will only send back the hash values 140 for the individual sectors associated with that sector directory (not the hash values 140 for every sector of the entire DSD 122). In embodiments using 64 sectors per sector directory (and 8-Byte hash values 140), the entire transmission will be only 512 Bytes, well below the upper limit for a single packet in a network 106 utilizing the TCP/IP protocol.

In block 322, once the hash values 140 have been received from the remote server 104, the OOB processor will perform the subroutine 210 (including steps 212-220, as shown in FIG. 2) for each sector of the associated sector directory requested by the remote server 104. As described above, the subroutine 210 will result in the OOB processor 126 determining whether an individual sector of the DSD 122 has been altered since the last scan by the remote server 104 and, thus, whether the sector should be transmitted (or not) to the remote server 104.

Where the new hash value 128 does not match the older hash value 128 for an associated sector directory, the OOB processor 126 will store the new hash value 128 in the dedicated memory space 116 (replacing the older hash value 128), as illustrated in block 324. In addition, where the new hash value 140 does not match the older hash value 140 for an individual sector, the OOB processor 126 may also inform the remote server to store the new hash value 140 in the mass storage device(s) 138 (replacing the older hash value 140), as illustrated in block 326. Thus, the dedicated memory space 116 and the mass storage device(s) 138 will contain updated hash values 128, 140 that may be used by the OOB processor 126 (for new comparisons) the next time a scan of a sector in the associated sector directory is requested by the remote server 104. After the OOB processor 126 has completed the blocks 314-326 for each sector requested by the remote server 104, the method 300 may return to block 310 and await another read request from the remote server 104.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure and the appended claims are desired to be protected.

The invention claimed is:

1. A method comprising:
computing, using an out-of-band (OOB) processor of a computing device, a first hash value for data stored in one or more sectors of a data storage device at a first time, the OOB processor being capable of communicating with a remote server irrespective of an operational state of an in-band processor of the computing device;
receiving, with the OOB processor, a request from the remote server to transmit a portion of the data stored in the one or more sectors of the data storage device at a second time, the second time being subsequent to the first time;
computing, using the OOB processor, a second hash value for the data stored in the one or more sectors of the data storage device at the second time; and
transmitting, with the OOB processor, the requested portion of the data to the remote server in response to the second hash value not matching the first hash value.

2. The method of claim 1, further comprising storing the first hash value in a dedicated memory space, the dedicated memory space being accessible to the OOB processor but not accessible to the in-band processor.

3. The method of claim 2, further comprising storing the second hash value in the dedicated memory space in place of the first hash value in response to the second hash value not matching the first hash value.

4. The method of claim 1, further comprising sending, with the OOB processor, a message to the remote server in response to the second hash value matching the first hash value, the message indicating that the requested portion of the data has not changed between the first time and the second time.

5. The method of claim 1, wherein:
computing the first hash value comprises applying a hash function to the data stored in a single sector of the data storage device at the first time;
receiving the request from the remote server comprises receiving a read request including the address of the single sector of the data storage device; and
computing the second hash value comprises applying the hash function to the data stored in the single sector of the data storage device at the second time.

6. The method of claim 1, wherein:
computing the first hash value comprises applying a hash function to the data stored in a sector directory of the data storage device at the first time, the sector directory including multiple sectors;
receiving the request from the remote server comprises receiving a read request including the address of at least one of the multiple sectors of the sector directory; and
computing the second hash value comprises applying the hash function to the data stored in the sector directory of the data storage device at the second time.

7. The method of claim 6, further comprising:
receiving, with the OOB processor, a third hash value from the remote server in response to the second hash value not matching the first hash value, the third hash value having been computed for the data stored in a single sector of the sector directory at a third time;

computing, using the OOB processor, a fourth hash value for the data stored in the single sector of the directory at the second time, the second time also being subsequent to the third time; and transmitting, with the OOB processor, the data stored in the one sector of the directory to the remote server in response to the fourth hash value not matching the second hash value.

8. The method of claim 7, further comprising sending, with the OOB processor, a message to the remote server in response to the fourth hash value matching the third hash value, the message indicating that the data stored in the single sector of the sector directory has not changed between the third time and the second time.

9. The method of claim 1, wherein receiving the request from the remote server comprises receiving, with the OOB processor, the request while the in-band processor is in a reduced-power operational state.

10. One or more non-transitory, machine-readable media comprising a plurality of instructions that, in response to being executed, result in an out-of-band (OOB) processor of a computing device:

computing a plurality of initial hash values, each initial hash value representing the data stored in at least one sector of a data storage device;

computing a subsequent hash value representing the data stored in at least one sector of the data storage device, in response to receiving a read request from a remote server; and transmitting the data represented by the subsequent hash value to the remote server in response to the subsequent hash value not matching one of the plurality of initial hash values, wherein the subsequent hash value and the one of the plurality of initial hash values represent data stored in the same at least one sector of the data storage device at distinct times.

11. The one or more non-transitory, machine-readable media of claim 10, wherein the plurality of instructions, in response to being executed, further result in the OOB processor of the computing device storing the plurality of initial hash values in a dedicated memory space, the dedicated memory space being accessible to the OOB processor but not accessible to an in-band processor of the computing device.

12. The one or more non-transitory, machine-readable media of claim 10, wherein the plurality of instructions, in response to being executed, further result in the OOB processor of the computing device sending a message to the remote server in response to the subsequent hash value matching the one of the plurality of initial hash values, the message indicating that the data represented by the subsequent hash value has not changed.

13. The one or more non-transitory, machine-readable media of claim 10, wherein:

computing the plurality of initial hash values comprises individually applying a hash function to the data stored in each sector of the data storage device; and computing the subsequent hash value comprises applying the hash function to the data stored in a single sector of the data storage device.

14. The one or more non-transitory, machine-readable media of claim 10, wherein computing the plurality of initial hash values comprises individually applying a hash function to the data stored in each sector directory of the data storage device, each sector directory including multiple sectors; and computing the subsequent hash value comprises applying the hash function to the data stored in a single sector directory of the data storage device.

15. The one or more non-transitory, machine-readable media of claim 14, wherein the plurality of instructions, in response to being executed, further result in the OOB processor of the computing device:

receiving, from the remote server, a hash value representing the data previously stored in a single sector of the single sector directory;

computing a hash value representing the data currently stored in the single sector;

comparing the computed hash value to the received hash value; and transmitting the data stored in the single sector to the remote server in response to the computed hash value not matching the received hash value.

16. A computing device comprising:

an in-band processor;

a data storage device;

communication circuitry configured to communicate with a remote server; and an out-of-band (OOB) processor capable of communicating with the remote server using the communication circuitry irrespective of an operational state of the in-band processor, the OOB processor configured to:

compute a first hash value for data stored in one or more sectors of the data storage device at a first time;

receive, using the communication circuitry, a request to transmit a portion of the data stored in the one or more sectors of the data storage device at a second time, the second time being subsequent to the first time;

compute a second hash value for the data stored in the one or more sectors of the data storage device at the second time; and transmit, using the communication circuitry, the requested portion of the data, only if the second hash value does not match the first hash value.

17. The computing device of claim 16, further comprising a dedicated memory space, the dedicated memory space being accessible to the OOB processor but not accessible to the in-band processor.

18. The computing device of claim 17, wherein the dedicated memory space is located in a nonvolatile memory device of the computing device.

19. The computing device of claim 17, wherein the dedicated memory space comprises a dedicated partition of the data storage device.

20. The computing device of claim 17, wherein the OOB processor further configured to store the first hash value in the dedicated memory space.

* * * * *